US009522445B2

(12) United States Patent
Chung et al.

(10) Patent No.: US 9,522,445 B2
(45) Date of Patent: Dec. 20, 2016

(54) CAULKING METHOD FOR PREVENTING PISTON OF HYDRAULIC/PNEUMATIC CYLINDER FROM BEING LOOSENED

(71) Applicant: VOLVO CONSTRUCTION EQUIPMENT AB, Eskilstuna (SE)

(72) Inventors: Yun-Hyun Chung, Changwon-si (KR); Ki-Cheon Song, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/430,090

(22) PCT Filed: Sep. 24, 2012

(86) PCT No.: PCT/KR2012/007627
§ 371 (c)(1),
(2) Date: Mar. 20, 2015

(87) PCT Pub. No.: WO2014/046322
PCT Pub. Date: Mar. 27, 2014

(65) Prior Publication Data
US 2015/0224610 A1    Aug. 13, 2015

(51) Int. Cl.
*F16J 1/00*     (2006.01)
*B23P 15/00*    (2006.01)
(Continued)

(52) U.S. Cl.
CPC ........ *B23P 15/10* (2013.01); *F16J 1/12* (2013.01); *F16B 39/02* (2013.01); *Y10T 29/49256* (2015.01)

(58) Field of Classification Search
CPC .............. Y10T 29/49881; Y10T 29/49256; Y10T 29/5393; F16B 39/02; F16B 39/026; B23P 15/10; B21D 41/04; F16J 1/12
(Continued)

(56) References Cited

U.S. PATENT DOCUMENTS 1,746,326 A * 2/1930 Tomkinson ............. B25B 31/00
                                                  29/234
2,652,733 A * 9/1953 Gilda ...................... B25B 27/00
                                                  29/271
(Continued)

FOREIGN PATENT DOCUMENTS

| CN | 201851455 U | 6/2011 |
|----|----|----|
| JP | 02-180384 A | 7/1990 |

(Continued)

OTHER PUBLICATIONS

International Search Report (in Korean and English) and Written Opinion (in Korean) for PCT/KR2012/007627, mailed Apr. 22, 2013; ISA/KR.

(Continued)

*Primary Examiner* — Essama Omgba
(74) *Attorney, Agent, or Firm* — Harness, Dickey & Pierce, P.L.C.

(57) ABSTRACT

A caulking method for preventing a piston from being loosened in a hydraulic or pneumatic cylinder. The method includes forming a screw hole and a mutual screw engagement portion of a cylinder rod and a piston, and fasteningly engaging a set screw with the screw hole. The method also includes pressing a remaining space portion of the screw hole in an engagement direction of the set screw using a press mechanism after fasteningly engaging the set screw (Continued)

with the screw hole to change a pitch of a screw thread of an inlet portion of the screw hole.

3 Claims, 7 Drawing Sheets

(51) Int. Cl.
  *B23P 15/10* (2006.01)
  *F16J 1/12* (2006.01)
  *F16B 39/02* (2006.01)
(58) Field of Classification Search
  USPC .......................................... 29/441.1; 72/377
  See application file for complete search history.

(56) References Cited

U.S. PATENT DOCUMENTS

| | | | |
|---|---|---|---|
| 5,078,294 A | 1/1992 | Staubli | |
| 8,672,978 B2* | 3/2014 | Dant | A61B 17/7032 606/250 |
| 2012/0158064 A1* | 6/2012 | Kroll | A61B 17/7052 606/250 |
| 2012/0226316 A1* | 9/2012 | Dant | A61B 17/705 606/250 |
| 2013/0195581 A1* | 8/2013 | Unseld | B21H 3/08 411/427 |
| 2014/0145429 A1 | 5/2014 | Chung | |
| 2014/0148858 A1* | 5/2014 | Dant | A61B 17/705 606/278 |

FOREIGN PATENT DOCUMENTS

| | | |
|---|---|---|
| JP | 06-300010 A | 10/1994 |
| JP | 07-019230 A | 1/1995 |
| JP | 2006-316964 A | 11/2006 |
| KR | 10-0631066 B1 | 10/2006 |
| KR | 100846218 B1 | 7/2008 |
| KR | 100868799 B1 | 11/2008 |
| KR | 10-2009-0075361 A | 7/2009 |

OTHER PUBLICATIONS

Office Action issued by the State Intellectual Property Office of People's Republic of China (SIPO) on Aug. 2, 2016 for corresponding China Patent Application No. 201280075893.5 with English translation (12 pages).

* cited by examiner

Prior Art

Prior Art

Prior Art

Prior Art

CAULKING METHOD FOR PREVENTING PISTON OF HYDRAULIC/PNEUMATIC CYLINDER FROM BEING LOOSENED

TECHNICAL FIELD

The present invention relates to a caulking method for preventing a piston from being loosened in a hydraulic or pneumatic cylinder. More particularly, the present invention relates to such a caulking method for preventing a piston from being loosened in a hydraulic or pneumatic cylinder, in which the piston fastened to a cylinder rod of the hydraulic or pneumatic cylinder can be prevented from being loosened from the cylinder rod due to vibration occurring during the work.

BACKGROUND OF THE INVENTION

As shown in FIG. 1, a general hydraulic or pneumatic cylinder includes:

a cylindrical tube 1 that is opened at both ends thereof;

a cylinder rod 3 that linearly reciprocates in the tube 1 and includes a screw portion 2 formed at one end thereof;

a piston 4 that is screw-fastened to the screw portion 2 and is configured to partition the inside of the tube 1 into a large chamber and a small chamber to form a pressure when the cylinder rod 3 reciprocates in the tube;

a head cover 5 that prevents a hydraulic fluid from leaking through an opening formed at one side of the tube 1; and a cushion ring 6 that absorbs a mechanical shock of the piston 4 and the head cover 5 when the cylinder rod 3 is driven to extend to a maximum position.

In the drawings, non-explained reference numerals 7 and 8 denote a head rod and a cover end that allow the hydraulic or pneumatic cylinder to be rotatably mounted on an attachment of an excavator.

The fixed position of the piston of the hydraulic or pneumatic cylinder should be always constant in order to secure a stroke to completely perform a function of the hydraulic or pneumatic cylinder.

Meanwhile, the excavator is mainly used in an environment where the work conditions are poor. The piston of the hydraulic cylinder is exposed to an propulsive force, a severe vibration, and a shock by a high-pressure hydraulic fluid repeatedly applied to the piston.

For this reason, various loosening preventive mechanisms are used to prevent the piston 4 from being loosened from the cylinder rod 3. However, a loss of torque of the piston 4 with respect to the screw portion 2 of the cylinder rod 3 frequently occurs due to the shock repeatedly applied to the piston 4, and there is a high possibility that the internal parts of the hydraulic cylinder will be damaged due to the loosening of the piston 4.

Thus, hydraulic cylinder manufacturers employ the following methods as means for preventing the piston from being loosened from the cylinder rod after screw-fastening the piston to the cylinder rod:

1) A method for fixing the piston using a set screw, a key or a bolt;

2) A method for fixing the piston using a lock nut;

3) A method for fixing the piston using a nylon nut; and

4) A method for fixing the piston using a double nut of a left and right screw.

As shown in FIGS. 2(a), 3(a) and 3(b), a set screw for preventing the piston from being loosened from the cylinder rod in a hydraulic or pneumatic cylinder in accordance with the prior art is configured such that after a piston 4 is screw-fastened to a screw portion 2 of the cylinder rod 3, a screw hole 9 is axially formed in a mutual screw engagement portion of the cylinder rod 3 and the piston 4 and the set screw 10 is fasteningly engaged with the screw hole 9.

As shown in FIG. 2(b), a set screw for preventing the piston from being loosened from the cylinder rod in a hydraulic or pneumatic cylinder in accordance with the prior art is configured such that a piston 4 is screw-fastened to a first screw portion 3a of the cylinder rod 3 and a lock nut 11 formed integrally with the piston 4 is screw-fastened to a second screw portion 3b formed to have a diameter smaller than that of the first screw portion. In this case, a radial set screw 10 is fasteningly engaged with a screw hole penetratingly formed in the lock nut 11 in a radius direction of the lock nut 11 so as to prevent the piston 4 from being loosened from the cylinder rod.

As shown in FIG. 2(c), a set screw for preventing the piston from being loosened from the cylinder rod in a hydraulic or pneumatic cylinder in accordance with the prior art is configured such that a piston 4 is screw-fastened to a first screw portion 3a of the cylinder rod 3 and a lock nut 11 is screw-fastened to a second screw portion 3b formed to have a diameter smaller than that of the first screw portion. In this case, a set screw 10 is fasteningly engaged with a screw hole penetratingly formed in the lock nut 12 in a radius direction of the lock nut 12 so as to prevent the piston 4 from being loosened from the cylinder rod.

As described above, in the case where a torque of the set screw 10 additionally engaged with the screw hole to prevent the piston 4 from being loosened from the cylinder rod 3 is lost due to vibration applied to the piston 4, the set screw 10 is loosened or is separated from a fixed position thereof, and thus a function of completely preventing the loosening of the piston 4 cannot be expected.

For this reason, as shown in FIGS. 3(a) and 3(b), the piston 4 is screw-fastened to the screw portion 2 of the cylinder rod 3 and the set screw 10 is fasteningly engaged with the screw hole 9 in an axial or radial direction in such a manner as to caulk an inlet portion of the screw hole 9 so as to completely prevent the piston 4 from being loosened from the cylinder rod 3.

As shown in FIG. 3(a), in the case where a worker strikes four points around the inlet portion of the screw hole to caulk the inlet portion into a depth of 1-3 mm using a punching tool, a striking force or a caulking position of the punching tool is not uniform or a problem associated with stability of caulking modification is caused. For this reason, the set screw 10 engaged with the screw hole 9 to prevent the piston 4 from being loosened from the cylinder rod 3 may be separated from the screw hole.

As shown in FIG. 3(b), in the case where the set screw 10 engaged with the screw hole 9 to prevent the piston 4 from being loosened or separated from the cylinder rod 3 is loosened from the screw hole or separated from a fixed position thereof, the internal parts of a hydraulic cylinder may be damaged to degrade a performance thereof. In addition, a problem is involved in that the hydraulic cylinder may be damaged, leading to physical losses or casualties during the work.

SUMMARY OF THE INVENTION

Accordingly, the present invention has been made to solve the aforementioned problems occurring in the prior art, and it is an object of the present invention to provide a caulking method for preventing a piston from being loosened in a hydraulic or pneumatic cylinder, in which the piston is fastened to a cylinder rod and a pitch of a screw thread of a remaining screw portion is modified after assembling a set screw for preventing the piston from loosened from the cylinder rod so that resistance of the piston against being loosened from the cylinder rod can be maximized owing to a relative pitch difference between a screw thread of an assembly portion and a screw thread of the remaining screw portion, thereby preventing the piston from being loosened from the cylinder rod.

Another object of the present invention is to provide a caulking method for preventing a piston from being loosened in a hydraulic or pneumatic cylinder, in which the piston is semi-permanently prevented from loosened from a cylinder rod so that damage of the internal parts of a hydraulic cylinder can be prevented and safety accidents and casualties occurring due to damage of the hydraulic cylinder during the work can be prevented.

Technical Solution

To achieve the above object, in accordance with an embodiment of the present invention, there is provided a caulking method for preventing a piston from being loosened in a hydraulic or pneumatic cylinder including a tube, a cylinder rod that linearly reciprocates in the tube, the piston fastened to a screw portion of the cylinder rod, and a set screw that prevents the piston from being loosened from the cylinder rod, the method comprising the steps of:

forming a screw hole in a mutual screw engagement portion of the cylinder rod and the piston and fasteningly engaging the set screw with the screw hole; and pressing a remaining space portion of the screw hole in an engagement direction of the set screw using a press mechanism after fasteningly engaging the set screw with the screw hole to modify a pitch of a screw thread of an inlet portion of the screw hole.

In a preferred embodiment of the present invention, the press mechanism may include:

a hammer; and a press tool detachably mounted on the hammer, the press tool including a caulking guide portion coupled to a wrench hole of the set screw to secure a center position of caulking around the set screw and the screw hole during the caulking, and a stopper formed so as to extend from an inner end of the caulking guide portion to adjust a depth of the remaining space portion during the caulking.

A pitch of a screw thread of the pressed remaining space portion is modified to be equal to at least ⅓ of the pitch of the screw thread of the screw hole.

An impact hammer may be used as the hammer.

A vibrator may be used as the hammer.

A punching device may be used as the hammer.

In accordance with another embodiment of the present invention, there is provided a caulking method for preventing a piston from being loosened in a hydraulic or pneumatic cylinder including a tube, a cylinder rod that linearly reciprocates in the tube, the piston fastened to a first screw portion of the cylinder rod, a lock nut fastened to a second screw portion formed so as to extend from the cylinder rod, the second screw portion having a diameter smaller than that of the first screw portion, and a set screw that prevents the piston 4 from being loosened from the cylinder rod, the method including the steps of:

penetratingly forming a screw hole in the lock nut in a radius direction of the lock nut and fasteningly engaging the set screw with the screw hole; and pressing a remaining space portion of the screw hole in an engagement direction of the set screw using a press mechanism after fasteningly engaging the set screw with the screw hole to modify a pitch of a screw thread of an inlet portion of the screw hole.

The lock nut may be formed so as to extend integrally with the piston or may be formed so as to be separated from the piston.

Advantageous Effect

The caulking method for preventing a piston from being loosened in a hydraulic or pneumatic cylinder in accordance with an embodiment of the present invention as constructed above has the following advantages.

The piston can be semi-permanently prevented from loosened from the cylinder rod through the modification of the pitch of the screw thread of the remaining space portion of the screw hole with which the set screw is fasteningly engaged for the purpose of preventing the piston from being loosened. In addition, damage of the internal parts of a hydraulic cylinder or the like can be prevented by preventing the piston from being loosened, and safety accidents and casualties occurring due to damage of the hydraulic cylinder during the work can be prevented.

Besides, the caulking operation is performed using a hammering tool so that fatigue of a worker due to the caulking can be reduced and the caulking time can be shortened, thereby reducing the manufacturing cost.

Further, the caulking position of the press tool around the center of the screw hole with which the set screw is engaged can be accurately secured and the depth of the screw thread whose pitch is modified can be adjusted, thereby improving precision of the modification of the pitch of the screw thread of the remaining space portion during the caulking.

BRIEF DESCRIPTION OF THE DRAWINGS

The above objects, other features and advantages of the present invention will become more apparent by describing the preferred embodiments thereof with reference to the accompanying drawings, in which.

Figure 1:
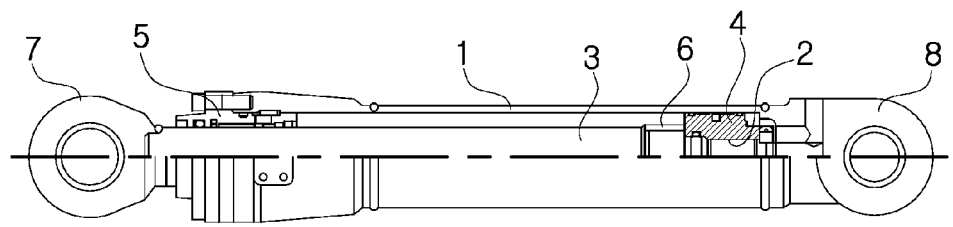
FIG. 1 is a schematic view showing a general hydraulic or pneumatic cylinder.
Figure 2A:
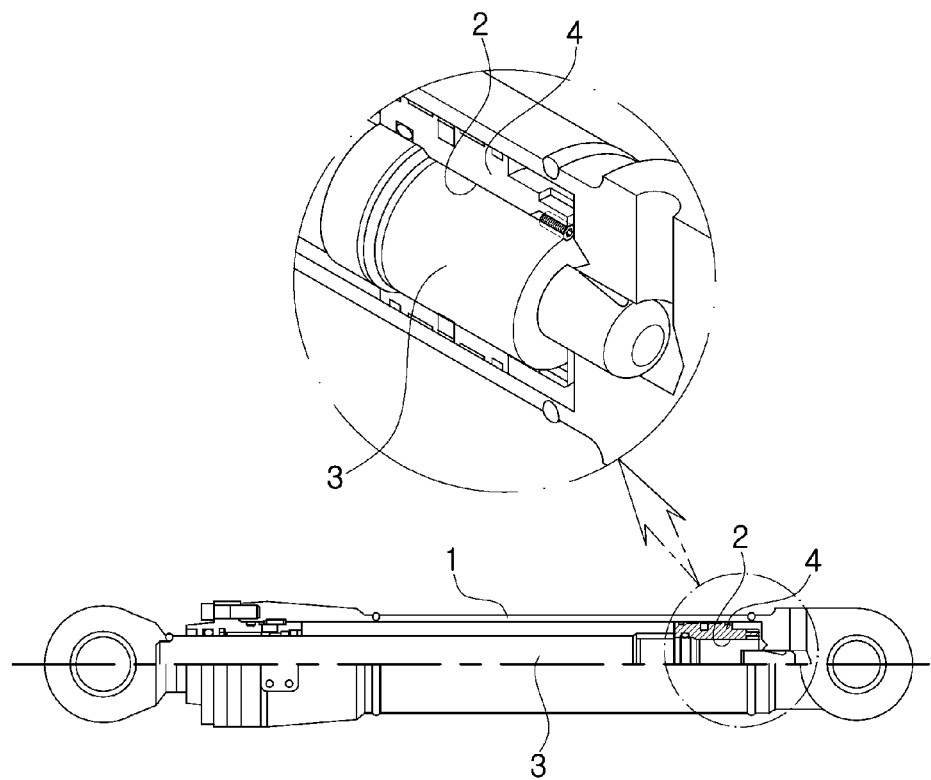
FIGS. 2a to 2c are schematic views showing a set screw for preventing a piston from being loosened in a hydraulic or pneumatic cylinder in accordance with the prior art.
Figure 2B:
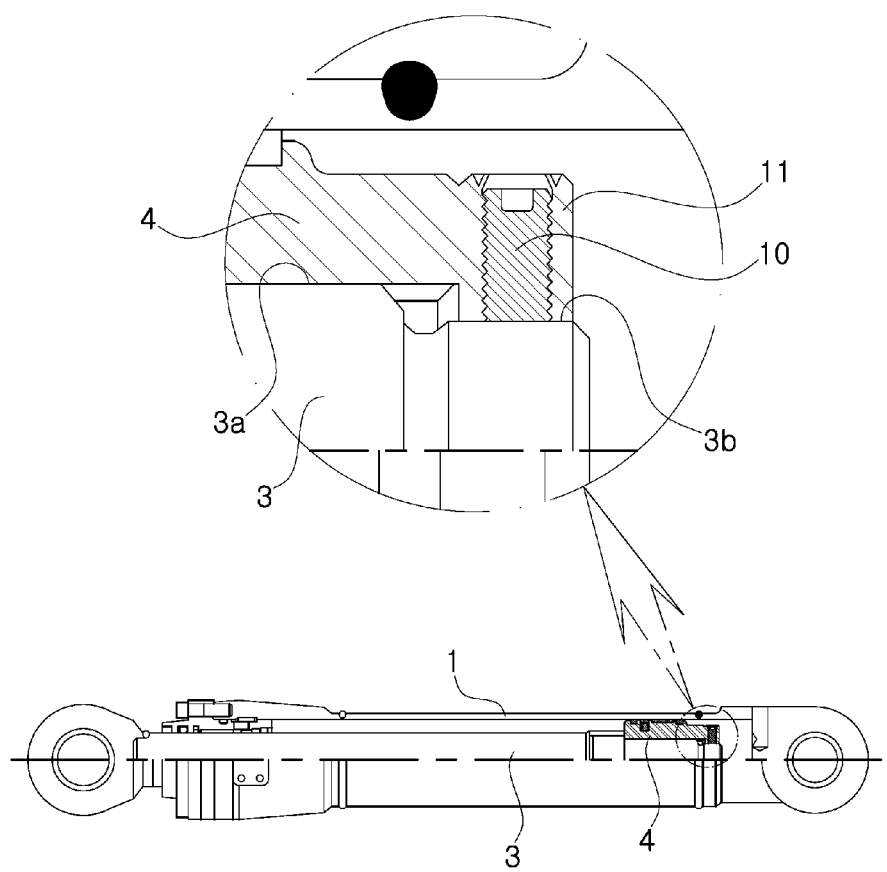
Figure 2C:
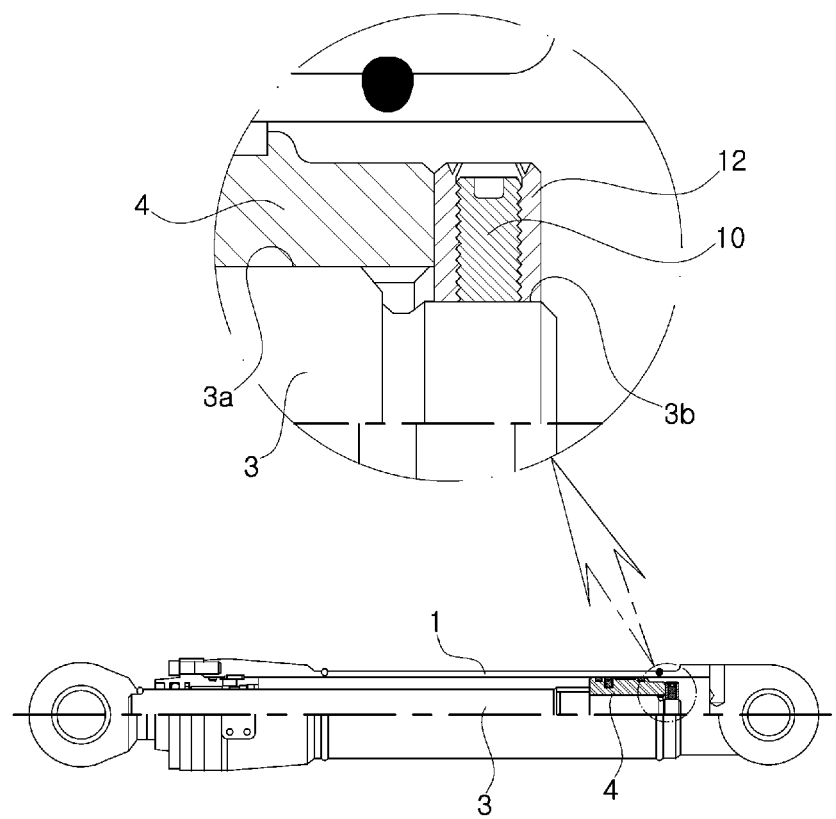
Figure 3A:
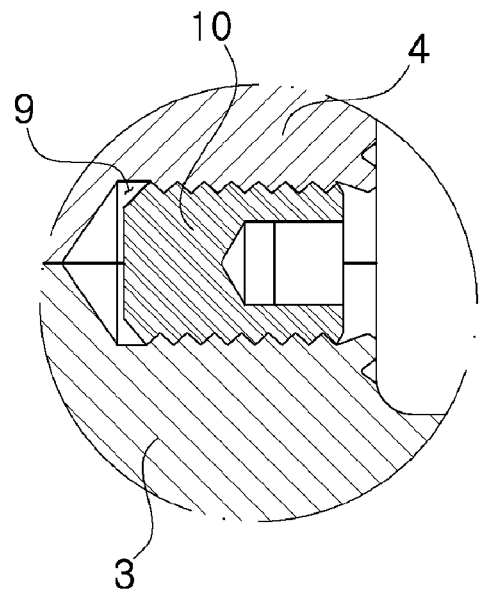
FIGS. 3a and 3b are schematic views showing a caulking operation for preventing a piston from being loosened in a hydraulic or pneumatic cylinder in accordance with the prior art.
Figure 3B:
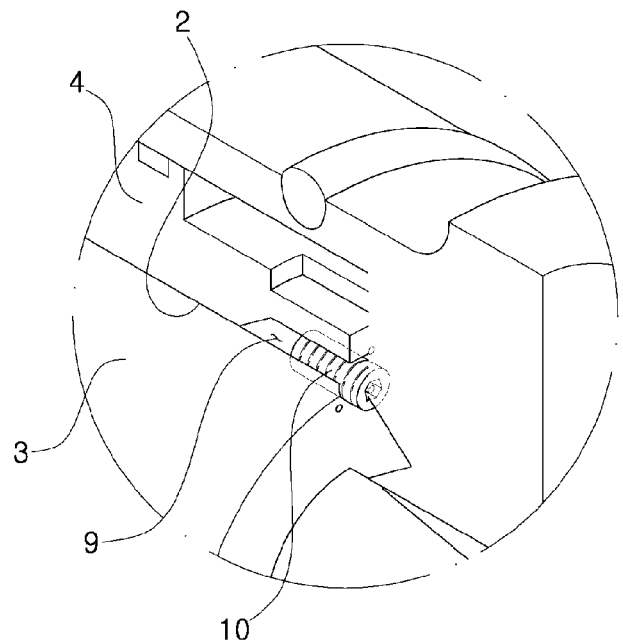

EXPLANATION ON REFERENCE NUMERALS
OF MAIN ELEMENTS IN THE DRAWINGS

10: set screw
15: screw hole
16: remaining space portion
17: screw thread
18: screw thread
19: caulking guide
20: stopper
21; press tool
22: lock nut

DETAILED DESCRIPTION OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 4:
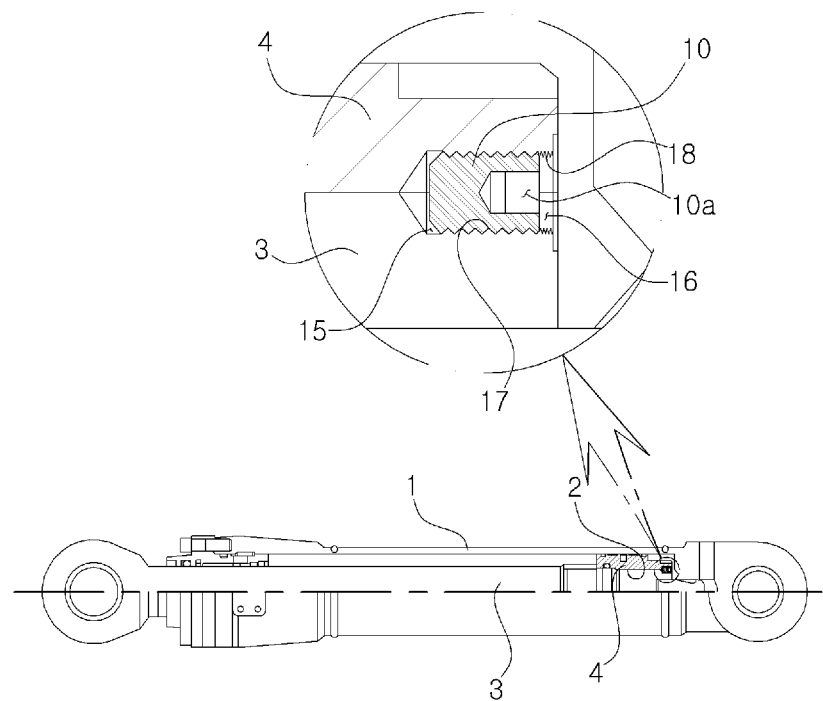
FIG. 4 is a schematic view showing a caulking method for preventing a piston from being loosened in a hydraulic or pneumatic cylinder in accordance with an embodiment of the present invention.
Figure 5:
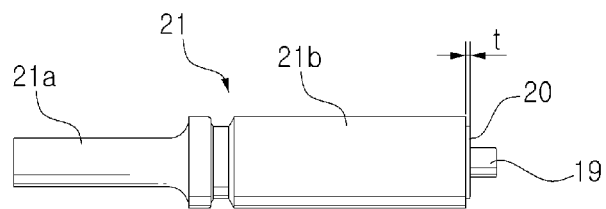
FIG. 5 is a schematic view showing a press tool used in a caulking method for preventing a piston from being loosened in a hydraulic or pneumatic cylinder in accordance with an embodiment of the present invention.
Figure 6:
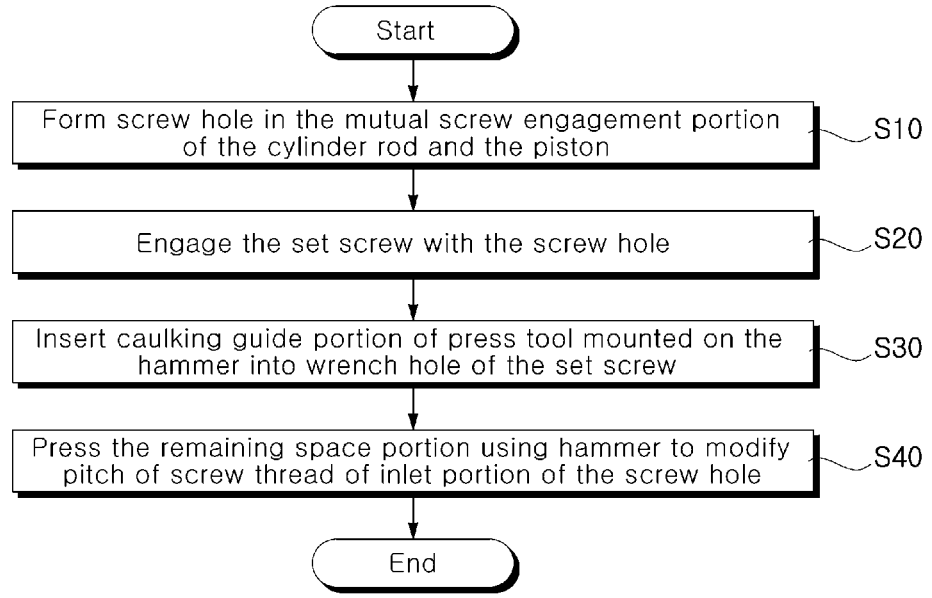
FIG. 6 is a process flow chart showing a caulking method for preventing a piston from being loosened in a hydraulic or pneumatic cylinder in accordance with an embodiment of the present invention.

As shown in FIGS. 4 to 6, the present invention is directed to a caulking method for preventing a piston from being loosened in a hydraulic or pneumatic cylinder including a tube 1, a cylinder rod 3 that linearly reciprocates in the tube 1, the piston 4 fastened to a screw portion 2 of the cylinder rod 3, and a set screw 10 that prevents the piston 4 from being loosened from the cylinder rod 3.

The caulking method for preventing a piston from being loosened in a hydraulic or pneumatic cylinder in accordance with an embodiment of the present invention includes the steps of:

axially forming a screw hole 15 in a mutual screw engagement portion of the cylinder rod 3 and the piston 4 and fasteningly engaging the set screw with the screw hole; and pressing a remaining space portion 16 of the screw hole 15 in an engagement direction of the set screw using a press mechanism after fasteningly engaging the set screw 10 with the screw hole 10 to change a screw thread pitch of an inlet portion of the screw hole 15.

As shown in FIG. 5, the press mechanism includes
a hammer (not shown); and
a press tool 21 including a shank portion 21a detachably mounted on the hammer, a body portion 21b formed so as to extend from the shank portion 21a, a caulking guide portion 19 formed so as to protrude from one end of the body 21b and coupled to a wrench hole 10a of the set screw 10 to secure a center position of caulking around the set screw 10 and the screw hole 15 during the caulking, and a stopper 20 formed so as to extend from an inner end of the caulking guide portion 19 to adjust a depth of the remaining space portion 16 during the caulking.

A pitch of a screw thread of the pressed remaining space portion 16 can be modified to be equal to at least ⅓ to ½ of the pitch of the screw thread of the screw hole 15.

The hammer that can be used in the present invention is an impact hammer.

The hammer that can be used in the present invention is a vibrator.

The hammer that can be used in the present invention is a punching tool.

Figure 7A:
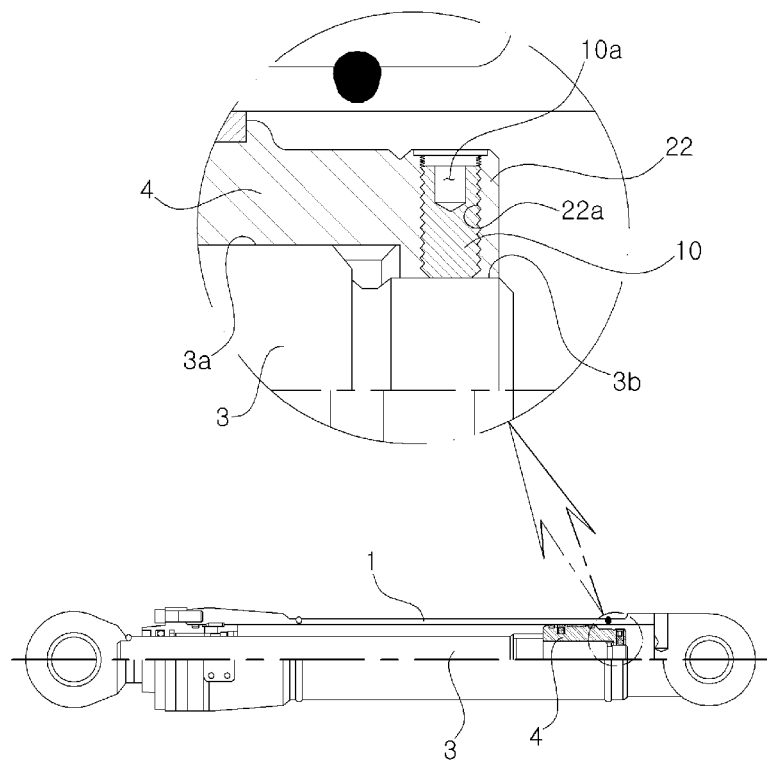
FIGS. 7a and 7b are schematic views showing a state in which a set screw is fastened to a lock nut in a caulking method for preventing a piston from being loosened in a hydraulic or pneumatic cylinder in accordance with another embodiment of the present invention.
Figure 7B:
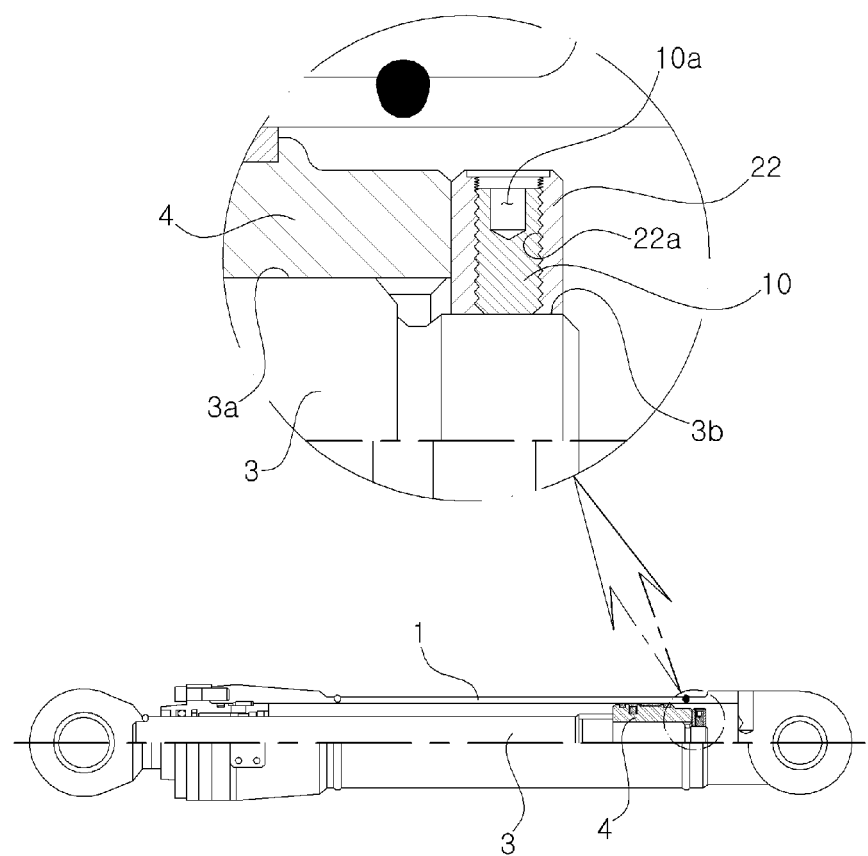

As shown in FIGS. 7a and 7b, the present invention is directed to a caulking method for preventing a piston from being loosened in a hydraulic or pneumatic cylinder including a tube 1, a cylinder rod 3 that linearly reciprocates in the tube 1, the piston 4 fastened to a first screw portion 3a of the cylinder rod 3, a lock nut 22 fastened to a second screw portion 3b formed so as to extend from the cylinder rod 3, the second screw portion having a diameter smaller than that of the first screw portion, and a set screw 10 that prevents the piston 4 from being loosened from the cylinder rod 3.

The caulking method for preventing a piston from being loosened in a hydraulic or pneumatic cylinder in accordance with another embodiment of the present invention includes the steps of:

forming a screw hole 22a in the lock nut 22 in a radius direction of the lock nut and fasteningly engaging the set screw 10 with the screw hole 22a; and pressing a remaining space portion 16 of the screw hole in an engagement direction of the set screw 10 using a press mechanism after fasteningly engaging the set screw 10 with the screw hole 22a to modify a pitch of a screw thread of an inlet portion of the screw hole 22a.

As shown in FIG. 7(a), the lock nut 22 can be formed so as to extend integrally with the piston 4.

As shown in FIG. 7(b), the lock nut 22 can be formed so as to be separated from the piston 4.

In this case, a configuration of the caulking method in accordance with another embodiment of the present invention is substantially the same as that of the caulking method in accordance with an embodiment of the present invention, except that the set screw 10 that prevents the piston 4 from being loosened from the cylinder rod 3 is fastened to the lock nut 22. Thus, the detailed description thereof will be omitted to avoid redundancy.

Hereinafter, a use example of a caulking method for preventing a piston from being loosened in a hydraulic or pneumatic cylinder in accordance with an embodiment of the present invention will be described in detail with reference to the accompanying drawings.

As shown in FIGS. 4 to 6, the piston 4 is fastened to the screw portion 2 of the cylinder rod 3 and the screw hole 15 is axially formed in the mutual screw engagement portion of the cylinder rod 3 and the piston 4 (S10).

In step S20, the set screw 10 is fasteningly engaged with the screw hole 15 so as to prevent the piston 4 from being loosened from the cylinder rod 3.

In step S30, the caulking guide portion 19 of the press tool 21 of which the shank portion 21a is mounted on the hammer is fittingly inserted into the wrench hole 10a of the set screw 10 through the remaining space portion 16 of the screw hole 15.

In step S40, the remaining space portion 16 is pressed in an engagement direction of the set screw 10 due to the caulking of the press tool 2 mounted on the hammer so that a pitch of a screw thread 18 of the inlet portion of the screw hole 15 is modified. In this case, the modification amount of the pitch of the screw thread 18 of the remaining space portion 16 is determined by a thickness (t) of the stopper 20 of the press tool 21, and the pitch of the screw thread 18 of the pressed remaining space portion 16 is preferably modified to be equal to about ⅓ of a pitch of a screw thread 17 of the screw hole 15.

In this case, the caulking guide portion 19 of the press tool 21 is fittingly inserted into the wrench hole 10a after passing through the remaining space portion 16, and thus the caulking position of the press tool 21 around the center of the screw hole 15 can be accurately secured and a striking force of the hammer can be maintained uniformly during the caulking of the press tool using an impact hammer, leading to an increase in the precision of the modification of the pitch of the screw thread 18 of the remaining space portion 16 during the caulking.

As a result of a modification test of the pitch of the screw thread 18 of the inlet portion of the screw hole 15 after the set screw 10 is fasteningly engaged with the screw hole 15, the values listed in Table 1 below could be confirmed.

In case of a test A, if the depth of the remaining space portion 16 of the screw hole 15 is 1 mm and a modified pitch of the screw thread 18 of the pressed remaining space portion 16 is 0.7 mm, the pitch of the screw thread 18 is modified to be equal to about ½ of the pitch of the screw thread 17 of the screw hole 15. Thus, it was confirmed that the set screw 10 can be loosened and mass production is impossible due to occurrence of a serious burr.

In case of a test B, if the depth of the remaining space portion 16 of the screw hole 15 is 3 mm and a modified pitch of the screw thread 18 of the pressed remaining space portion 16 is 0.8-1.2 mm, the pitch of the screw thread 18 is modified to be equal to about ⅓ to ½ of the pitch of the screw thread 17 of the screw hole 15. Thus, it was confirmed that the value of the modified pitch of the screw thread 18 of the pressed remaining space portion 16 is desirable.

In case of a test C, if the depth of the remaining space portion 16 of the screw hole 15 is 4 mm and a modified pitch of the screw thread 18 of the pressed remaining space portion 16 is 0.8-1.3 mm, the pitch of the screw thread 18 is modified to be equal to about ⅓ to ½ of the pitch of the screw thread 17 of the screw hole 15. Thus, it was confirmed that the value of the modified pitch of the screw thread 18 of the pressed remaining space portion 16 is desirable.

In case of a test D, if the depth of the remaining space portion 16 of the screw hole 15 is 2.5 m and a modified pitch of the screw thread 18 of the pressed remaining space portion 16 is 1.2 mm, the pitch of the screw thread 18 is modified to be equal to about ½ of the pitch of the screw thread 17 of the screw hole 15. Thus, it was confirmed that mass production is impossible due to occurrence of a serious burr.

As can be been in the modification test results of the pitch of the screw thread 18 of the inlet portion of the screw hole 15, if the depth of the remaining space portion 16 of the screw hole 15 exceeds 4 mm, a pitch is created which is not modified during the caulking due to an excessive depth of the remaining space portion 16, resulting in a shift of the set screw 100 in the screw hole 16. On the other hand, if the depth of the remaining space portion 16 of the screw hole 15 is less than 3 mm, the pitch of the screw thread 18 is modified to be equal to about ½ of the pitch of the screw thread 17 of the screw hole 15. Thus, the set screw 10 can be loosened and a serious burr may occur.

TABLE 1

|  | A | B | C | D |
| --- | --- | --- | --- | --- |
| Depth (mm) of remaining space portion | 1 | 3 | 4 | 2.5 |
| Modified pitch (mm) | 0.7 | 0.8-1.2 | 0.8-1.3 | 1.2 |
| Max torque | 130 | 150 | 150 | 120 |
| Caulking ability | Mass production is impossible | Excellent | Excellent | Mass production is impossible |

As described above, the remaining space portion 16 is caulked by the press tool 21 fitted into the wrench hole 10a of the set screw 10 after the set screw 10 is fasteningly engaged with the screw hole 15 so that the piston 4 can be semi-permanently prevented from loosened from the cylinder rod 3 due to a relative pitch difference between the screw thread 17 of an assembly portion to which the set screw 10 is fastened and the screw thread 18 of the remaining space portion 16 (i.e., the pitch of the screw thread 18 of the remaining space portion 16 is relatively smaller than that of the screw thread 17 of the assembly portion)

INDUSTRIAL APPLICABILITY

In accordance with the caulking method for preventing a piston from being loosened in a hydraulic or pneumatic cylinder in accordance with the present invention as constructed above, the piston can be semi-permanently prevented from loosened from the cylinder rod through the modification of the pitch of the screw thread of the remaining space portion of the screw hole with which the set screw is fasteningly engaged for the purpose of preventing the piston from being loosened. In addition, the caulking operation is performed using a hammering tool so that fatigue of a worker due to the caulking can be reduced and the caulking time can be shortened. Further, the caulking position of the press tool around the center of the screw hole with which the set screw is engaged can be accurately secured and the depth of the screw thread whose pitch is modified can be adjusted.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A caulking method for preventing a piston from being loosened in a hydraulic or pneumatic cylinder including a tube, a cylinder rod that linearly reciprocates in the tube, the piston fastened to a screw portion of the cylinder rod, and a set screw that prevents the piston from being loosened from the cylinder rod, the method comprising the steps of:

forming a screw hole in a mutual screw engagement portion of the cylinder rod and the piston and fasteningly engaging the set screw with the screw hole; and pressing a remaining space portion of the screw hole in an engagement direction of the set screw using a press mechanism after fasteningly engaging the set screw with the screw hole to change a pitch of a screw thread of an inlet portion of the screw hole;

wherein the press mechanism includes:

a hammer; and a press tool detachably mounted on the hammer, the press tool including a caulking guide portion coupled to a wrench hole of the set screw to secure a center position of caulking around the set screw and the screw hole during the caulking, and a stopper formed so as to extend from an inner end of the caulking guide portion to adjust a depth of the remaining space portion during the caulking.

2. The caulking method according to claim 1, wherein a pitch of a screw thread of the pressed remaining space portion is modified to be equal to at least ⅓ of the pitch of the screw thread of the screw hole.

3. The caulking method according to claim 1, wherein the hammer is any one of an impact hammer, a vibrator, and a punching device.

* * * * *